United States Patent (10) Patent No.: US 7,464,918 B2
Hatakeyama et al. (45) Date of Patent: Dec. 16, 2008

(54) LIQUID SEALING TYPE VIBRATION CONTROL DEVICE

(75) Inventors: Shingo Hatakeyama, Osaka (JP); Masaaki Ito, Osaka (JP); Tomoyoshi Edo, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 367 days.

(21) Appl. No.: 10/552,254

(22) PCT Filed: Jan. 9, 2004

(86) PCT No.: PCT/JP2004/000134

§ 371 (c)(1),
(2), (4) Date: Jul. 10, 2006

(87) PCT Pub. No.: WO2004/090373

PCT Pub. Date: Oct. 21, 2004

(65) Prior Publication Data

US 2006/0267259 A1 Nov. 30, 2006

(30) Foreign Application Priority Data

Apr. 4, 2003 (JP) .............................. 2003-102031
Dec. 22, 2003 (JP) .............................. 2003-424012

(51) Int. Cl.
*F16M 13/00* (2006.01)
(52) U.S. Cl. .................................. 267/140.13; 267/219
(58) Field of Classification Search ............ 267/140.11, 267/140.13, 140.14, 219
See application file for complete search history.

(56) References Cited

U.S. PATENT DOCUMENTS

| 4,621,795 | A |   | 11/1986 | Eberhard et al. |
| 4,647,023 | A | * | 3/1987  | Ray et al. .................... 267/219 |
| 4,671,227 | A |   | 6/1987  | Hollerweger et al. |
| 4,679,776 | A |   | 7/1987  | Remmel et al. |
| 4,711,206 | A | * | 12/1987 | Andra et al. ........... 267/140.13 |
| 4,726,573 | A |   | 2/1988  | Hamaekers et al. |
| 4,815,720 | A |   | 3/1989  | Vanessi |
| 4,938,463 | A | * | 7/1990  | Miyamoto ............. 267/140.13 |

(Continued)

FOREIGN PATENT DOCUMENTS

JP 60-184738 9/1985

(Continued)

*Primary Examiner*—Christopher P Schwartz
(74) *Attorney, Agent, or Firm*—Westerman, Hattori, Daniels & Adrian, LLP.

(57) ABSTRACT

Provided is a liquid sealing type vibration control device capable of sufficiently reducing strange sounds which comprises a first attachment fitting (1), a second attachment fitting (2), a vibration-isolating base body (3), a diaphragm (9), a partition body (12), and an orifice (25), the partition body (12) including an elastic partition membrane (15) and a pair of lattice members (17, 18). The elastic partition membrane (15) is provided on its both faces with rib groups (50) in a projecting manner, the rib groups (50) each consist of plural first ribs (51) and plural second ribs (52) mingled mutually, the first ribs (51) are set in such a height dimension that their tops can be situated apart from the lattice members (17, 18), and the second ribs (52) are set in such a height dimension that their tops abut on the lattice members (17, 18) and in a smaller rib width than the first ribs (51).

11 Claims, 8 Drawing Sheets

U.S. PATENT DOCUMENTS

| | | | |
|---|---|---|---|
| 4,974,818 A * | 12/1990 | Kato | 267/140.13 |
| 5,104,100 A * | 4/1992 | Simuttis | 267/140.13 |
| 5,240,233 A | 8/1993 | Kato | |
| 5,443,245 A * | 8/1995 | Bellamy et al. | 267/140.13 |
| 6,425,575 B1 | 7/2002 | Takashima et al. | |
| 6,910,683 B2 * | 6/2005 | Itoh et al. | 267/140.13 |
| 6,923,435 B2 * | 8/2005 | Pizanti et al. | 267/140.13 |
| 7,344,128 B2 * | 3/2008 | Muramatsu et al. | 267/140.13 |

FOREIGN PATENT DOCUMENTS

| | | |
|---|---|---|
| JP | 64-12153 | 1/1989 |
| JP | 64-15551 | 1/1989 |
| JP | 1-98720 | 4/1989 |
| JP | 2-125119 | 5/1990 |
| JP | 3-62243 | 6/1991 |
| JP | 3-168439 | 7/1991 |
| JP | 6-129472 | 5/1994 |
| JP | 6-221368 | 8/1994 |
| JP | 9-32878 | 2/1997 |
| JP | 9-280304 | 10/1997 |

* cited by examiner

LIQUID SEALING TYPE VIBRATION CONTROL DEVICE

TECHNICAL FIELD

This invention relates to a liquid sealing type vibration control device which comprises a first attachment fitting, a cylindrical second attachment fitting, a vibration isolating base body made of rubber-like elastic material interconnecting these, a diaphragm attached to the second attachment fitting and forming a liquid sealing chamber between the vibration isolating base body and itself, a partition body comparting the liquid sealing chamber into a first liquid chamber on a side of the vibration isolating base body and a second liquid chamber on a side of the diaphragm, and an orifice putting the first liquid chamber and the second liquid chamber into communication with each other, the partition body including an elastic partition membrane and a pair of lattice members regulating a displacement amount of the elastic partition membrane from both sides thereof.

BACKGROUND ART

The aforementioned liquid sealing type of vibration control device is installed, for example, between an engine and a vehicle body frame of an automobile. When a large amplitude vibration is generated owing to irregularities of a travelling road surface, the liquid flows between both liquid chambers through the orifice, thereby damping the vibration by the liquid fluidization effect. On the other hand, when a fine amplitude vibration is generated, the liquid does not flow between both liquid chambers, but the elastic partition membrane reciprocates and deforms to damp the vibration.

In the liquid sealing type vibration control device of this kind, strange sounds (noises) are liable to be generated when the elastic partition membrane impinges on the lattice members. To cope with this, hitherto, the lattice members have been provided with radial ribs, as disclosed in JP Patent Application Publication 6(1994)-221368 A. And besides the elastic partition membrane has been able to be situated apart from the lattice members (cf. ibid., FIG. 4).

DISCLOSURE OF THE INVENTION

According to the prior art construction above, it is possible to reduce the strange sounds can be reduced to some degree, but the generation of impinging sounds when the elastic partition membrane impinges on the ribs of the lattice members is inevitable, and consequently, it has been unable so far to sufficiently reduce the strange sounds.

An object of the invention is to provide a liquid sealing type vibration control device capable of reducing sufficiently strange sounds.

In the liquid sealing type vibration control device stated at the outset, features of this invention reside in that the elastic partition membrane is provided on both faces thereof with rib groups in a projecting manner, the rib groups each consist of a plurality of first ribs and a plurality of second ribs mutually mingled, a height dimension of the first ribs are set so that top parts of them can be situated apart from the lattice members, and a height dimension of the second ribs are set so that top parts of them may abut on the lattice members and a rib width of the second ribs are set to be smaller than that of the first ribs.

[A] According to the above-mentioned constitution, it is possible to allow the top parts of a plurality of the first ribs to be spaced apart from the lattice members and to put the top parts of a plurality of the second ribs in abutment state on the lattice members on either face of the elastic partition membrane (the one membrane face or the other membrane face). Therefore, in cases where the elastic partition membrane moves toward the lattice members with vibration, the second ribs resist and enable the top parts of the first ribs to moderately impinge on the surfaces of the lattice members. Since the first ribs and the second ribs are present in a mingled state, it is possible to avoid that the resistance force of a plurality of the second ribs concentrates on a part of the elastic partition membrane. Further since the second ribs are made smaller in width and weaker in stiffness than the first ribs, it is possible to prevent the elastic partition membrane from becoming hard to reciprocate.

In this invention, when the first ribs are disposed on each surface of the elastic partition membrane so as to be capable of surrounding lattice holes, every a given number of the lattice holes, and the second ribs are disposed on the surface of the elastic partition membrane in a distributed manner, the following operation can be achieved:

[B] Since the second ribs are arranged on the surfaces of the lattice members in a distributed manner, the concentration of the resistance force of a plurality of the second ribs on a part of the elastic partition membrane can be avoided. And in a large amplitude vibration state, when the top parts of the first ribs abut on the lattice members, the first ribs surround the lattice holes every a given number of them and consequently, it is possible to avoid that the liquid flows between the given number of the lattice holes and another lattice holes other than them, thereby to prevent a deterioration in antivibration performance.

In the invention, where the lattice holes are arranged in plural rows in the circumferential direction of each of the lattice members, a plurality of the first ribs are formed in an annular fashion and constructed to be capable of abutting on parts of the each lattice member on both sides of each lattice holes row in the radial direction of the lattice member, and a plurality of the second ribs are arranged in a radial fashion relative to an axis center of the elastic partition membrane, the following operation can be achieved:

[C] That is, in a large amplitude vibration state, when the top parts of the first ribs abut on the lattice members, a plurality of the first ribs surround the lattice holes every lattice holes row. And flowing of liquid between lattice holes of a certain lattice holes row and another lattice holes of an adjacent lattice holes row to the former can be prevented. Since the second ribs are arranged in a radial fashion relative to the axis center of the elastic partition membrane, it is possible to avoid the concentration of the resistance force of a plurality of the second ribs on a local part of the elastic partition membrane.

In the present invention, where the first ribs and the second ribs are arranged on a surface of the elastic partition membrane so as to be capable of surrounding the lattice holes every a given number of the lattice holes, in a large amplitude vibration state, when the top parts of the first ribs abut on the lattice members, the first ribs and the second ribs surround the lattice holes every the given number of them and consequently, it is possible to avoid flowing of liquid between the given number of lattice holes and another lattice holes other than these, thereby preventing a deterioration in antivibration performance.

Where a high frequency vibration is input to the present device, the elastic partition membrane reciprocates and deforms, thereby absorbing the internal pressure of the first liquid chamber to suppress an increasingly higher dynamic spring of the present device. However, it is conceivable that when a vibration in a further higher frequency region is input, the displacement resistance of the elastic partition membrane is increased, resulting in an insufficient low dynamic spring. In view of this, in the present invention, where a stirring plate is provided in the first liquid chamber and an orifice on a side of the first liquid chamber is formed between an outer peripheral edge of the stirring plate and an inner peripheral surface of the vibration isolating base body, it is possible to resonate the liquid flowing through the first liquid chamber side orifice in the high frequency region (to set the resonance frequency of the liquid at a high value) and to achieve a lower dynamic spring of the present device.

In the instant invention, it is possible to construct so that a joining portion of the stirring plate on its center side is supported and connected to one end of a support spindle connected to the first attachment fitting, piercing through the vibration isolating base body.

With the construction that the vibration isolating base body is vulcanization bonded to the support spindle and the joining portion on the center side of the stirring plate is secured by crimping to the one end of the support spindle, it is possible to suppress an increase in number of components to simplify the structure.

Further it is possible to make such a constitution that the inner peripheral surface of the vibration isolating base body forming a chamber wall of the first liquid chamber is made up of a tapered face whose remoter side from the partition body is of a smaller radius and a straight drum-like face of a constant radius connected to a maximum radius portion of the tapered face, and the size and position of the stirring plate is set so that the first liquid chamber side orifice is formed between a part of the tapered face in the vicinity of the maximum radius portion and the stirring plate.

In accordance with this invention, it was able to provide such a liquid sealing type vibration control device that enables the top parts of the first ribs to impinge moderately on the surfaces of the lattice members to reduce sufficiently strange sounds.

Further either where the first ribs are arranged on the surface of the elastic partition membrane so as to be capable of surrounding lattice holes every a given number of the lattice holes and the second ribs are arranged on the surface of the elastic partition membrane in a distributed manner or where the first ribs and the second ribs are arranged on the surface of the elastic partition membrane so as to be capable of surrounding lattice holes every a given number of the lattice holes, in a large amplitude vibration state, it was able to prevent the liquid from flowing between the given number of the lattice holes and another lattice holes other than them when the top parts of the first ribs abut on the surface of the elastic partition membrane, and thus it was able to provide the liquid sealing type vibration control device capable of enhancing more antivibration performance.

Moreover, where the stirring plate is provided in the first liquid chamber and the first liquid chamber side orifice is formed between the outer peripheral edge of the stirring plate and the inner peripheral face of the vibration isolating base body, it is possible to provide the liquid sealing type vibration control device capable of absorbing sufficiently vibrations over a wide range from a low frequency to a high frequency, in addition to the aforementioned effects.

BEST MODE FOR CARRYING OUT THE INVENTION

Embodiments of the invention will be hereinafter described with reference to the accompanying drawings.

First Embodiment

Figure 1:
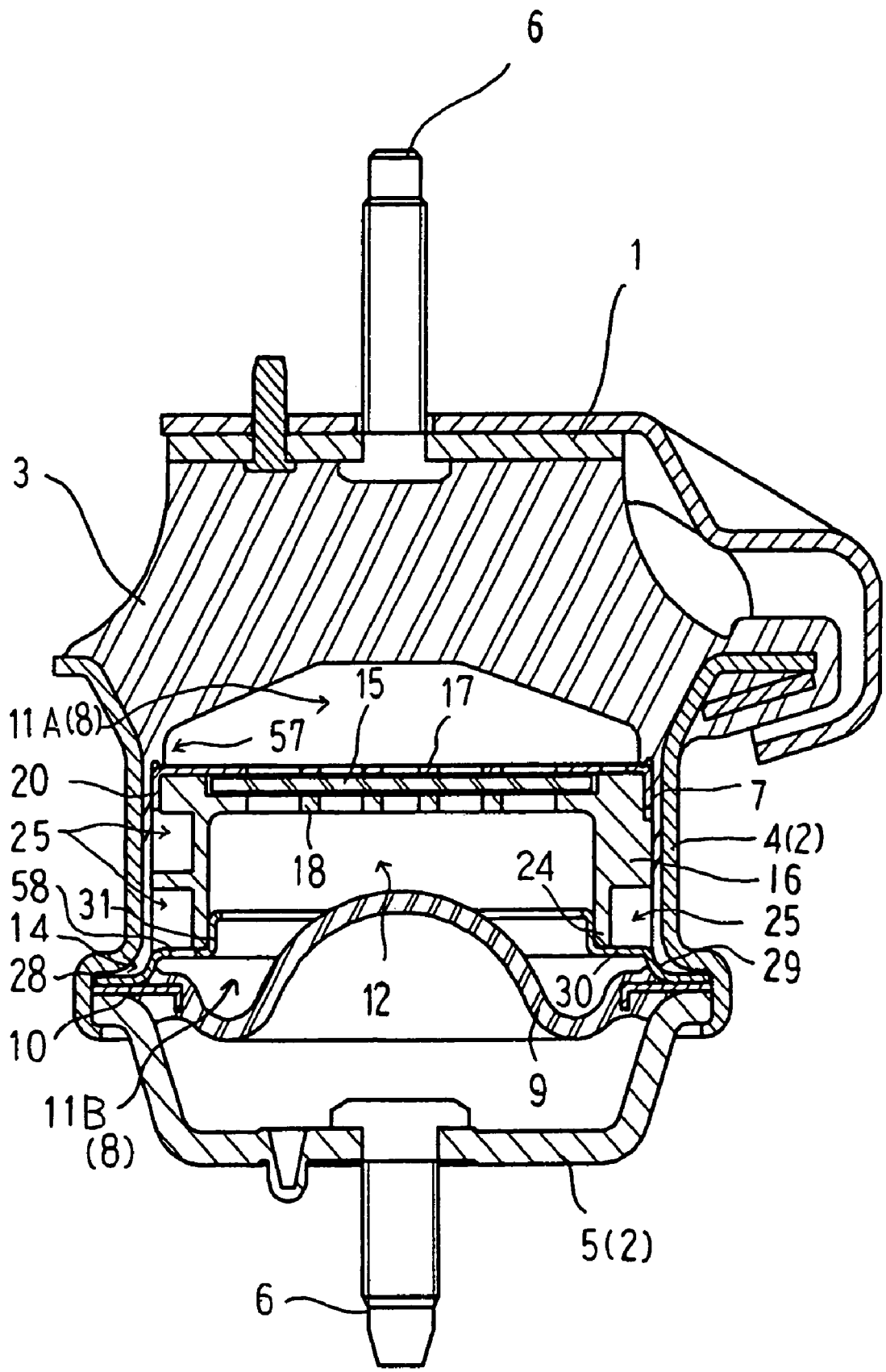
FIG. 1 is a longitudinal sectional view of a liquid sealing type vibration control device.

Now, the embodiment of the invention will be described with reference to the drawings. FIG. 1 indicates the liquid sealing type vibration control device. This vibration control device includes a first attachment fitting 1 to be mounted on an engine of an automobile, a second attachment fitting 2 in a cylindrical form to be mounted on a vehicle body frame beneath the engine, and a vibration isolating base body 3 made of rubber-like elastic material and interconnecting these.

The first attachment fitting 1 is fashioned in a plate shape and provided with an attachment bolt 6 oriented upwardly. The second attachment fitting 2 includes a cylindrical fitting 4, to which the vibration isolating base body 3 is vulcanization molded, and a cup-shaped bottom fitting 5, in a central part of which a downwardly oriented attachment bolt 6 is provided projectingly.

The vibration isolating base body 3 is fashioned in a truncated cone shape. And its upper end face and its lower end part are bonded by vulcanization, respectively, to the first attachment fitting 1 and an upper end opening of the cylindrical fitting 4 in a splaying form. Beneath an underside of the vibration isolating base body 3, an upwardly narrowing hollow space is defined, and to a lower end part of the vibration isolating base body 3, a rubber film 7 covering the inner peripheral surface of the cylindrical fitting 4 is connected.

To the second attachment fitting 2 is attached a partially spherical diaphragm 9 made of a rubber membrane forming a liquid sealing chamber 8 between the underside of the vibration isolating base body 3 and itself. The liquid sealing chamber 8 is sealed with liquid. The diaphragm 9 is covered with the bottom fitting 5.

Figure 10:
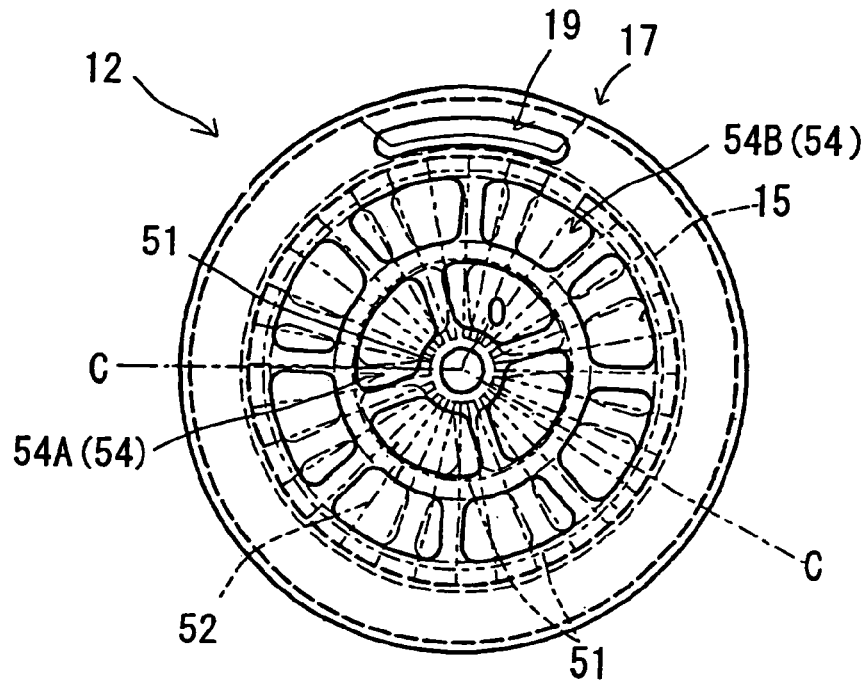
FIG. 10 is a plan view of a partition body.
Figure 11:
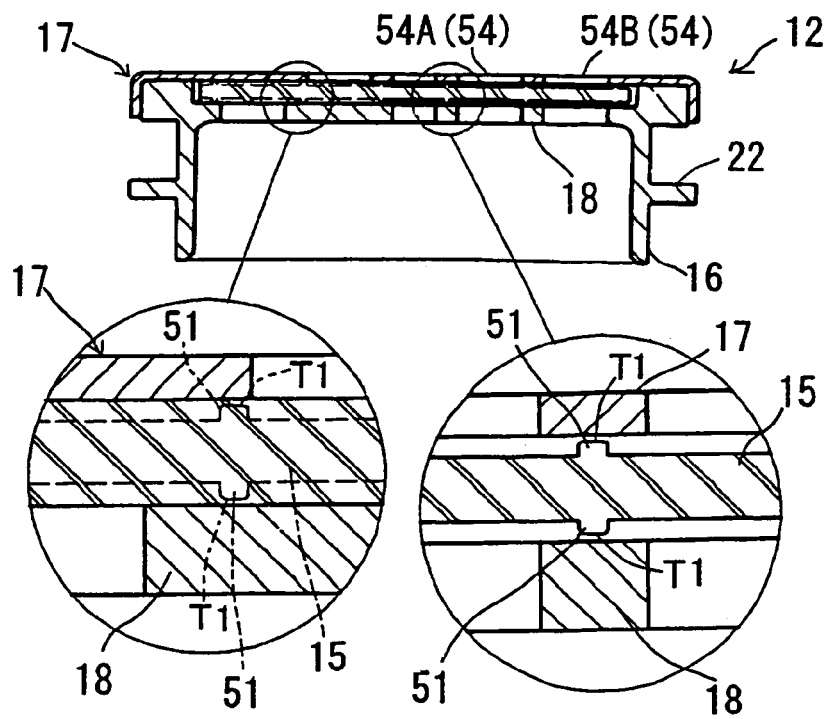
FIG. 11 is a sectional view taken along C-O-C line in FIG. 10.

As also shown in FIGS. 10 and 11, a partition body 12 is provided to compart the liquid sealing chamber 8 into a first liquid chamber 11A on a side of the vibration isolating base body 3 and a second liquid chamber 11B on a side of the diaphragm. The partition body 12 is pinched and secured by a sandwiching member 14 provided on the inner periphery side of the second attachment fitting 2 and the vibration isolating base body 3.

More specifically stated, the partition body 12 is made up of an elastic partition membrane 15 in a disc shape made of rubber membrane, a cylinder member 16 accommodating the elastic partition membrane 15 to receive it with a lattice wall 18 (corresponding to a lattice member) between inner peripheral faces thereof, and a partition membrane displacement-regulating member 17 (corresponding to a lattice member) in a lattice disc shape covering an opening of the cylinder member 16 on its one end side. That is, the lattice wall 18 and the partition membrane displacement-regulating member 17 serve to regulate a displacement amount of the elastic partition membrane 15 from both sides of the membrane 15.

Figure 2:
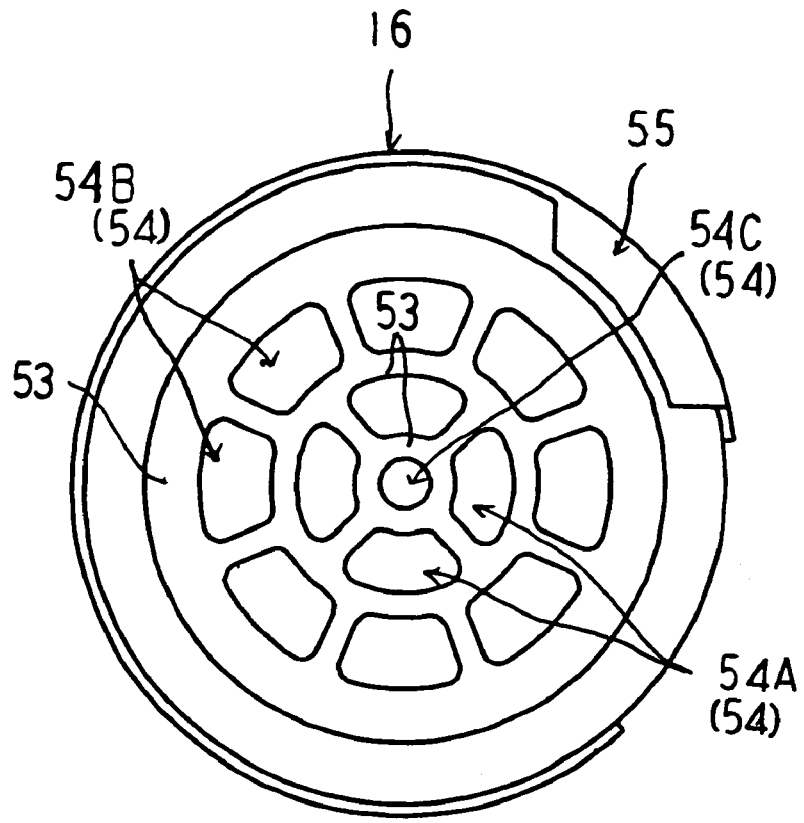
FIG. 2 is a plan view of a cylinder member.
Figure 3:
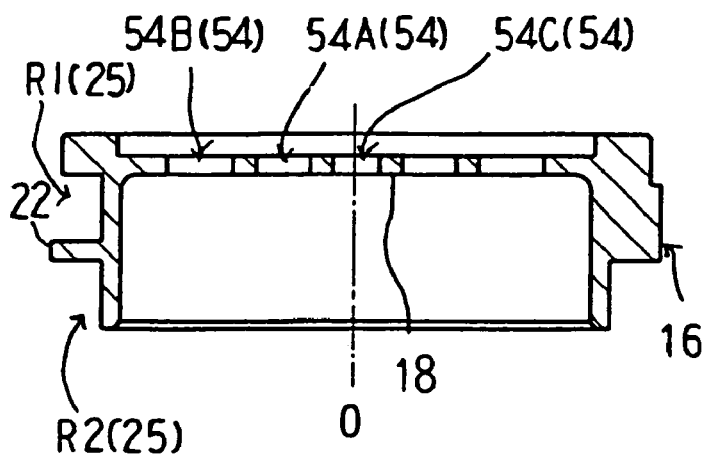
FIG. 3 is a front view in longitudinal cross-section of the cylinder member.
Figure 4:
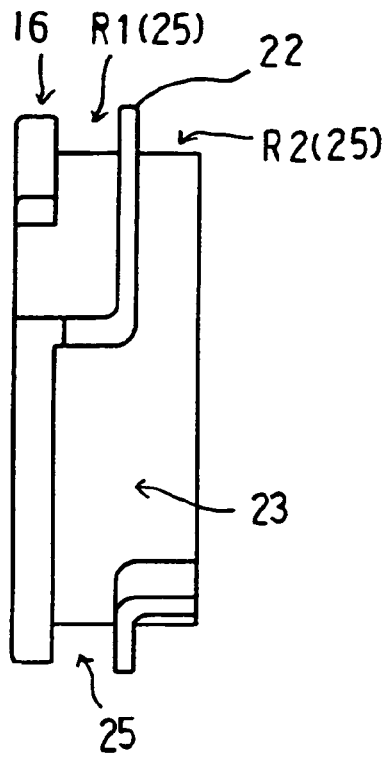
FIG. 4 is a side elevational view of the cylinder member.

An orifice 25 for putting the first liquid chamber 11A and the second liquid chamber 11B into communication with each other is formed between the outer peripheral face of the cylinder member 16 and the inner peripheral face of the second attachment fitting 2. As illustrated in FIGS. 2, 3 and 4, an orifice passage makes two rounds around an axis center O of the cylinder member 16. That is, the orifice passage consists of an upper one round orifice passage R1 and a lower one round orifice passage R2. The reference numeral 22 designates an orifice-forming wall. The upper orifice passage R1 communicates with an opening 19 (cf. FIG. 5) of the partition membrane displacement-regulating member 17 through a cutout 55. The lower orifice passage R2 communicates with the second liquid chamber 11B through an opening 58 (cf. FIG. 1).

The sandwiching member 14 is, as shown in FIG. 1, made up of a flat plate part 28 on its outer periphery side, a first cylinder part 29 internally fitting in a lower end of the rubber film 7, a flat plate part 30 at its intermediate part imposing a forcing action on the other end 24 of the cylinder member 16, and a second cylinder part 31 internally fitting in an opening on a side of the other end 24 of the cylinder member 16. The flat plate part 28 on the outer periphery side is fixed by crimping together with an attaching plate 10 for the diaphragm 9, the cylindrical fitting 4 and the bottom fitting 5.

Figure 5:
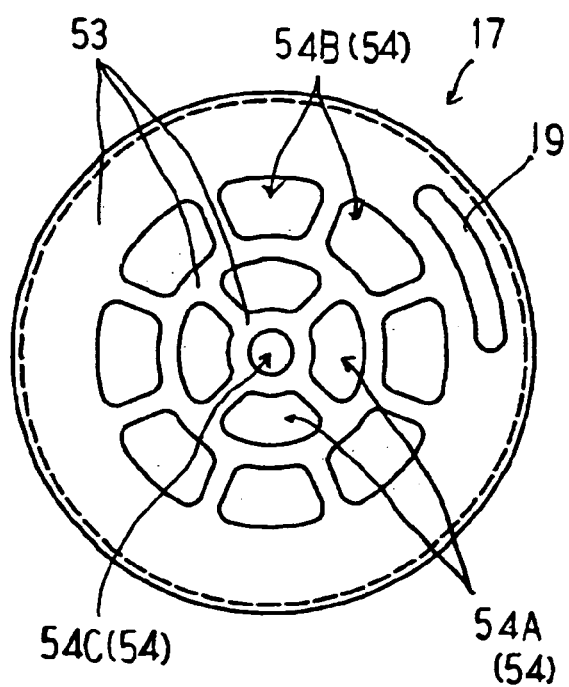
FIG. 5 is a plan view of a partition membrane displacement-regulating member.
Figure 6:
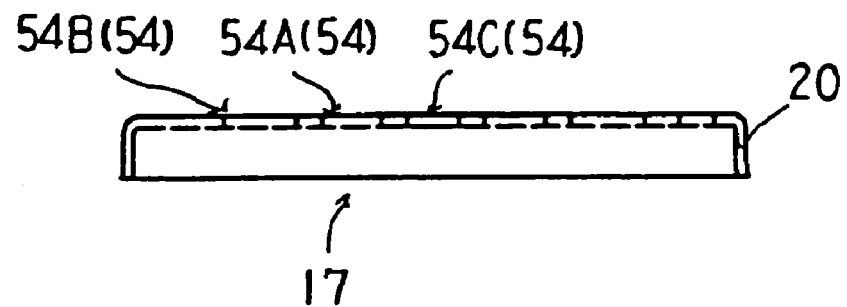
FIG. 6 is a front elevation of the partition membrane displacement-regulating member.

As illustrated in FIGS. 5 and 6, the partition membrane displacement-regulating member 17 is provided on its outer periphery side with a circular cylinder part 20, which is in turn externally fitted in one end of the cylinder member 16. And it is received on a step portion 57 of the vibration isolating base body 3 in the axis center direction of the cylinder member 16. Lattice holes 54 of the partition membrane displacement-regulating member 17 consist of a lattice hole 54C on the center side and two rows of lattice holes 54A, 54B arranged in the circumferential direction of the partition membrane displacement-regulating member 17. The number of the lattice holes 54A in the inner row is four and the number of the lattice holes 54B in the outer row is eight They are respectively arranged at equal angle intervals (90 degrees or 45 degrees). The inner row of the lattice holes 54A and the outer row of the lattice holes 54B at 90 degrees intervals are registered in the circumferential direction. The shape of the lattice holes row is such that an annular hole extending along the circumferential direction is divided in a radial fashion. The reference numeral 19 designates an opening putting the first liquid chamber 11A and the orifice 25 into communication with each other.

The lattice holes 54 of the lattice wall 18 likewise consist of the lattice hole 54C on the center side and two rows of the lattice holes 54A, 54B arranged in the circumferential direction of the lattice wall 18. The pattern of them (number, shape, position around the axis center L of the lattice wall 18) is the same as that on the side of the partition membrane displacement-regulating member 17. But the cylinder part 20 of the partition membrane displacement-regulating member 17 is externally fitted in the cylinder member 16 so that the lattice holes 54A, 54B of the lattice wall 18 and the lattice holes 54A, 54B of the partition membrane displacement-regulating member 17 are shifted in position in the circumferential direction (cf. FIG. 10). The positions of the lattice holes 54C of both on the center side are the same.

Figure 7:
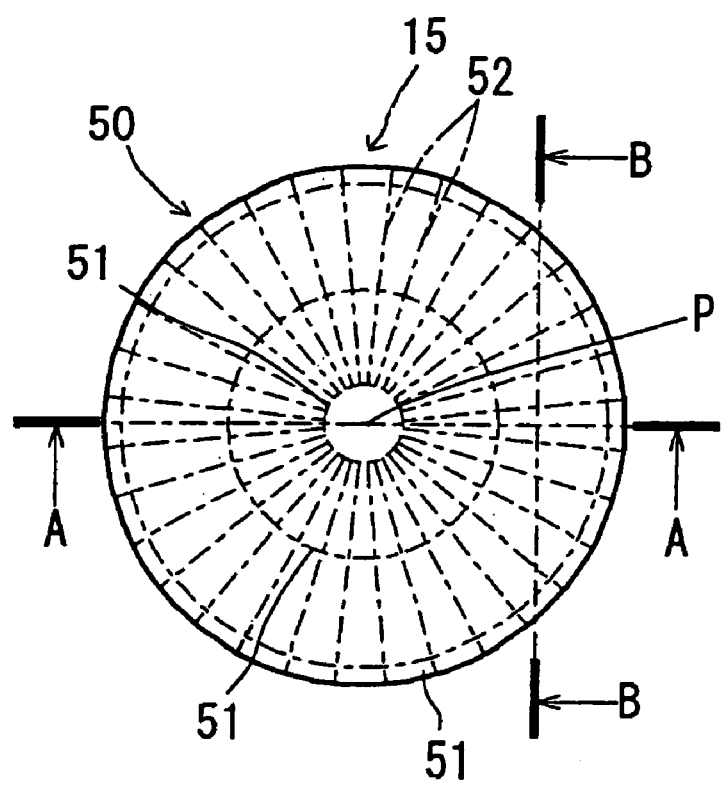
FIG. 7 is a plan view of an elastic partition membrane.
Figure 8:
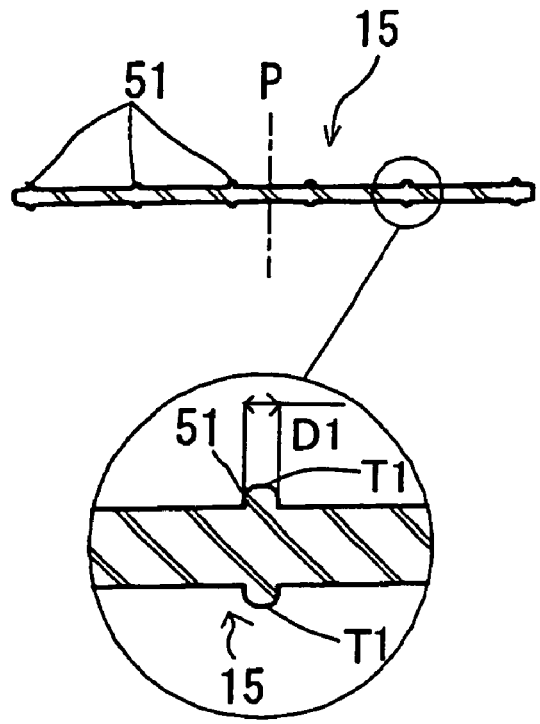
FIG. 8 is a sectional view taken along A-A line in FIG. 7.
Figure 9:
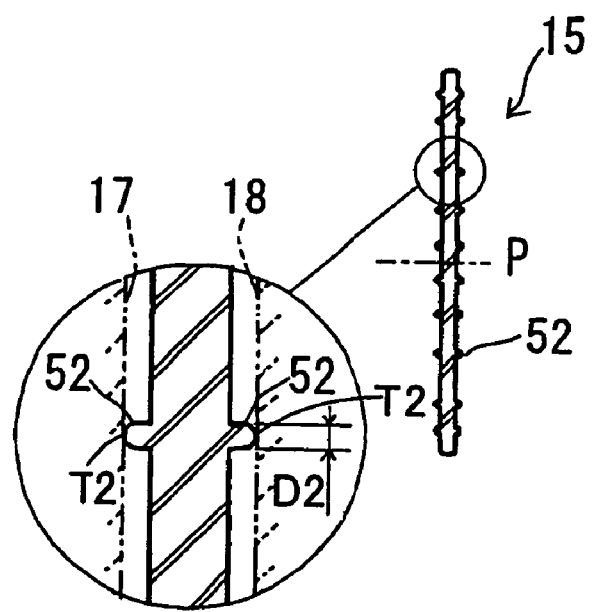
FIG. 9 is a sectional view taken along B-B line in FIG. 7.

As illustrated in FIGS. 7, 8 and 9, rib groups 50 are provided projectingly on both faces of the elastic partition membrane 15. The pattern of the rib group 50 on the one face and the pattern of the rib group 50 on the other face are the same. The rib groups 50 each consist of a plurality of first ribs 51 capable of surrounding the lattice holes 54 every a plurality of them and a plurality of second ribs 52 arranged over the whole surface of the elastic partition membrane 15 in a distributed manner.

A plurality of the first ribs 51 are formed in an annular fashion relative to an axis center P of the elastic partition membrane 15 and constructed to be capable of abutting on a part 53 of the lattice member on both sides of each lattice holes row in the radial direction of the lattice wall 18 (or the partition membrane displacement-regulating member 17). Thereby the first ribs surround the lattice holes 54 every row (the inner row, the outer row). Moreover the first ribs 51 are set in such a height dimension that their top parts T1 can be situated apart from the lattice wall 18 (or the partition membrane displacement-regulating member 17) (cf. FIG. 11). That is, in an incorporated state, the top parts T1 of the first ribs 51 on the one face of the elastic partition membrane 15 are spaced apart from the partition membrane displacement-regulating member 17 and the top parts T1 of the first ribs 51 on the other face are spaced apart from the lattice wall 18.

The second ribs 52 are arranged in a radial fashion relative to the axis center P of the elastic partition membrane 15. And the height dimension of the second ribs is set so that their top parts T2 may always abut on the lattice wall 18 (or the partition membrane displacement-regulating member 17). That is, as shown in an enlarged view of FIG. 9, in an incorporated state, the top parts T2 of the second ribs 52 on the one face of the elastic partition membrane 15 are made to abut on the partition membrane displacement-regulating member 17 and the top parts T2 of the second ribs 52 are made to abut on the lattice wall 18. Further, a rib width D1 of the first ribs 51 and a rib width D2 of the second ribs 52 are set so that the second ribs 52 are smaller in width than the first ribs 51 (D2<D1). As stated above, a plurality of the first ribs 51 and a plurality of the second ribs 52 are mingled with one another.

Second Embodiment

Figure 12:
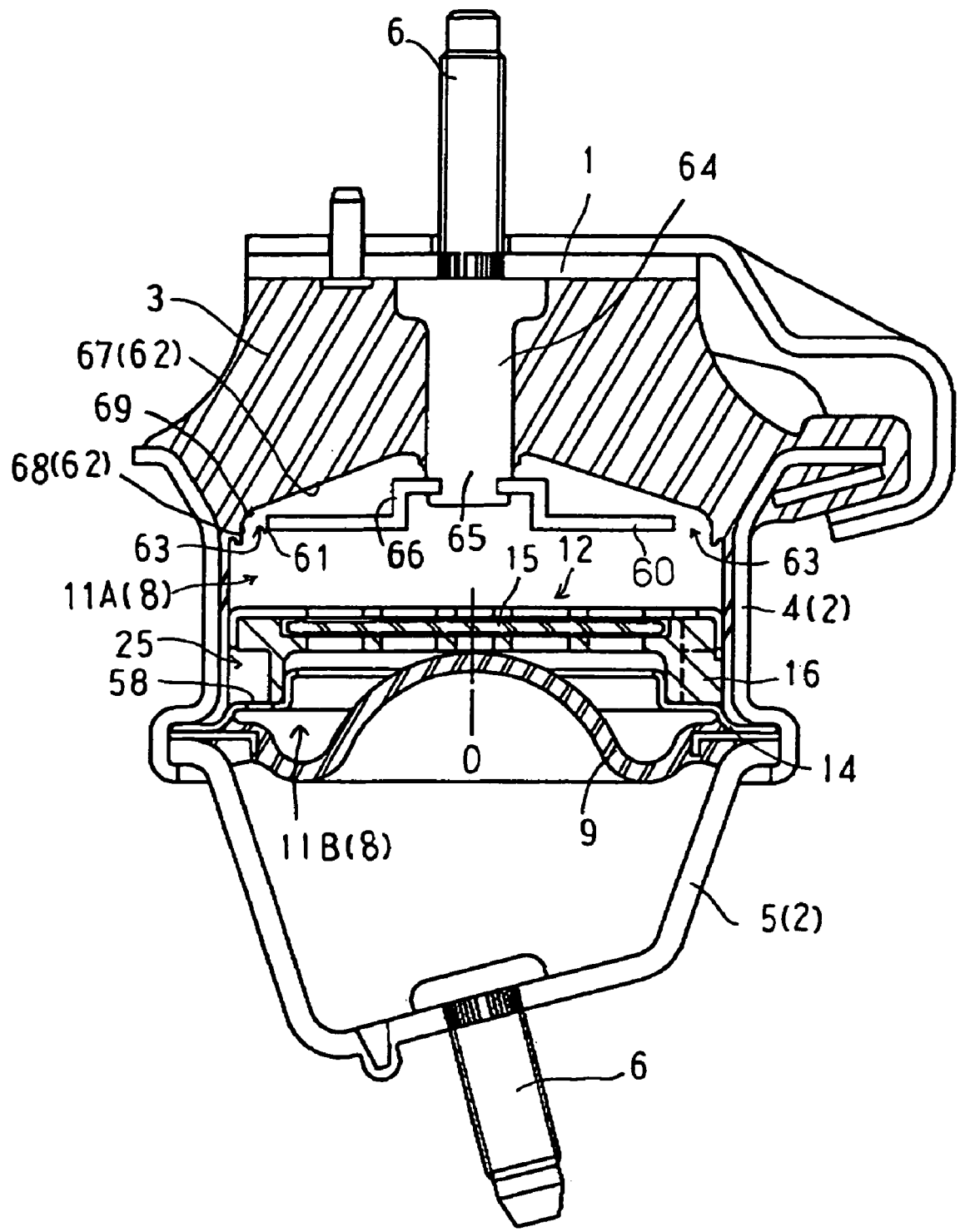
FIG. 12 is a longitudinal sectional view of the liquid sealing type vibration control device in a second embodiment.
Figure 13:
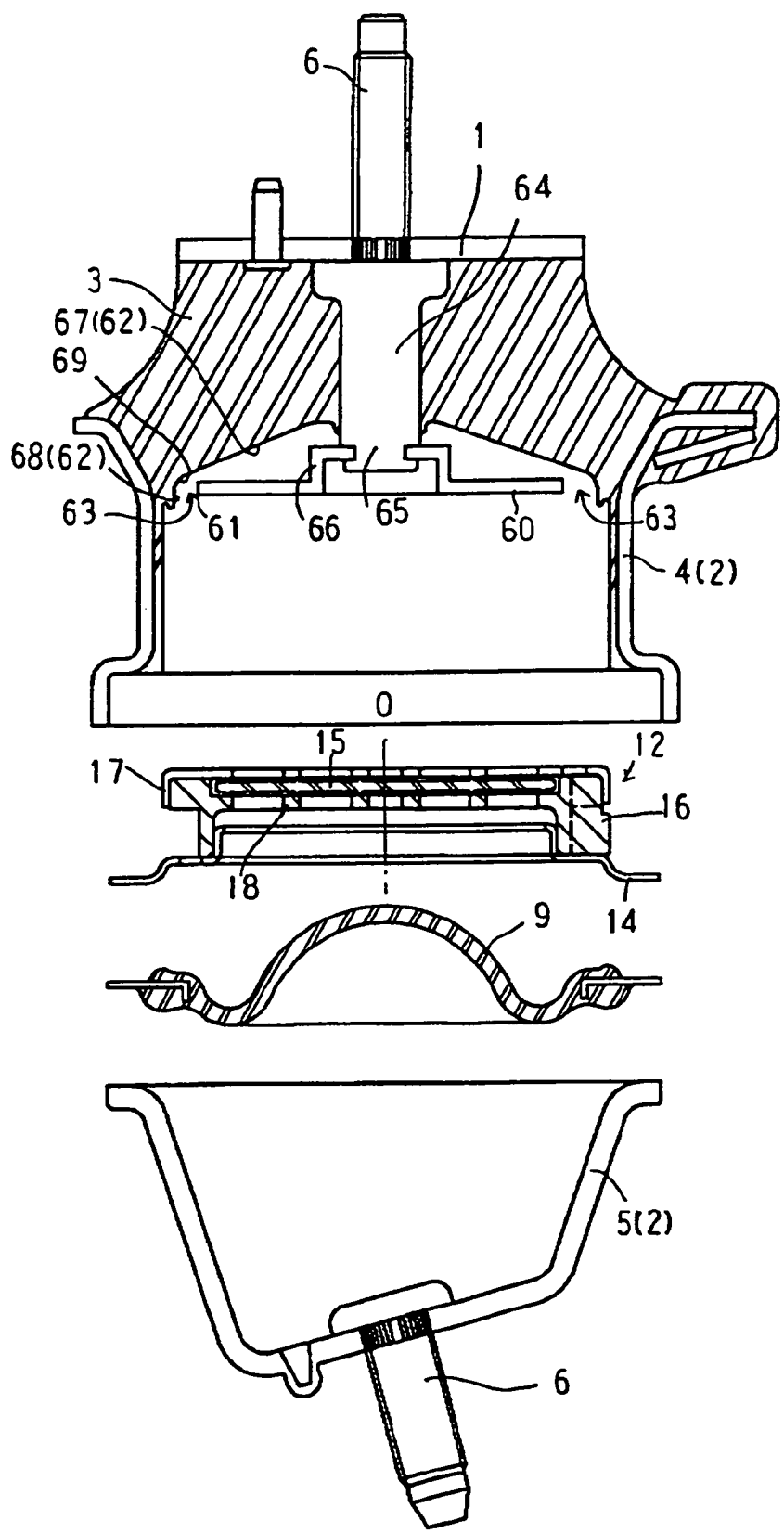
FIG. 13 is an exploded view in longitudinal cross-section of the liquid sealing type vibration control device in the second embodiment.

As shown in FIGS. 12 and 13, it is the structure of the partition body 12 (specifically, the structure of the orifice 25), the structure of the bottom fitting 5, and the structure of the interior of the first liquid chamber 11A that are different from the first embodiment. The other constitution than them is the same as in the first embodiment, and different points of the aforementioned structures will be explained.

<Structure of the Partition Body 12>

The orifice 25 makes one round about the axis center O of the cylinder member 16. The orifice 25 communicates with the opening of the partition membrane displacement-regulating member 17 through the cutout. And it communicates with the second liquid chamber 11B through the opening 58 of the sandwiching member 14.

<Structure of the Bottom Fitting 5>

It is tilted at a given angle relative to the axis center of the cylindrical fitting 4.

<Structure of the Interior of the First Liquid Chamber 11A>

A stirring plate 60 in a disc shape is provided within the first liquid chamber 11A, and a first liquid chamber side orifice 63 is formed between an outer peripheral edge 61 of the stirring plate 60 and an inner peripheral face 62 of the vibration isolating base body 3. That is, to one end part 65 (a lower end) of a support spindle 64 piercing through the vibration isolating base body 3 to be connected to the first attachment fitting 1, a joining portion 66 of the stirring plate 60 on its center side is supported and connected. The joining portion 66 bulges upwardly. Further the attachment bolt 6 on the side of the first attachment fitting 1 is formed integrally with the support spindle 64.

The aforementioned vibration isolating base body 3 is vulcanization bonded to the support spindle 64 and the joining portion of the stirring plate 60 on the center side is secured by crimping to the one end part 65 of the support spindle 64. The inner peripheral face 63 of the vibration isolating base body 3 forming a chamber wall of the first liquid chamber 11A is made up of a tapered face 67, whose remoter side from the partition body 12 is smaller in radius, and a straight drum-like face 68 of a constant radius connected to a maximum radius portion of the tapered face 67, and the size and position of the stirring plate 60 is set so that the first liquid chamber side orifice. 63 may be formed between a tapered face part 69 in the vicinity of the maximum radius portion and the stirring plate.

Another Embodiments

[1] The aforementioned rib group 50 may consist of a plurality of the first ribs 51 capable of surrounding the lattice holes 54 every lattice hole and a plurality of the second ribs 52 arranged on the surface of the elastic partition membrane 15 in a distributed manner. In this case, the pattern of the second ribs 52 may be any pattern other than a radial pattern, as also mentioned in [4] below.

[2] In the embodiments described above, it is the first ribs of the elastic partition membrane 15 that surround a given number of the lattice holes, but instead of this, the given number (single or plural) of the lattice holes 54 may be surrounded, for example, by ribs in a rectangular frame form formed of the first ribs and the second ribs. In that case, two transverse sides and two longitudinal sides of the rectangular frame can be alloted to the first rib and the second rib, respectively.

[3] This invention is applicable even to cases where the first ribs 51 and the second ribs 52 do not surround the lattice holes 54.

[4] The pattern of the lattice holes 54 and the patterns of the first ribs 51 and the second ribs 52 are not limited to the patterns in the aforementioned embodiments.

INDUSTRIAL APPLICABILITY

According to this invention, it is possible to provide the liquid sealing type vibration control device capable of reducing sufficiently strange sounds, and the liquid sealing type vibration control device can be utilized as a vibration control device for damping vibrations of various vibrating bodies, typically an automotive vibration control device installed between an engine and a vehicle body of an automobile to damp its vibrations.

The invention claimed is:

1. A liquid sealing type vibration control device comprising:
   a first attachment fitting;
   a second attachment fitting;
   a vibration isolating base body made of rubber-like elastic material interconnecting these;
   a diaphragm attached to the second attachment fitting to form a liquid sealing chamber between the vibration isolating base body and itself;
   a partition body comparting the liquid sealing chamber into a first liquid chamber on a side of the vibration isolating base body and a second liquid chamber on a side of the diaphragm; and
   an orifice putting the first liquid chamber and the second liquid chamber into communication with each other,
   the partition body including an elastic partition membrane and a pair of lattice members regulating a displacement amount of the elastic partition membrane from both sides thereof,
   wherein the elastic partition membrane is provided, on both faces thereof, with respective rib groups in a projecting manner;
   the rib groups each consist of a plurality of first ribs and a plurality of second ribs mingled with one another;
   the first ribs are arranged on a surface of the elastic partition membrane so as to be capable of surrounding lattice holes every lattice hole or a plurality of lattice holes and the second ribs are arranged on the surface of the elastic partition membrane in a distributed fashion;
   the first ribs are set in such a height dimension that top parts of them can be situated apart from the lattice members; and
   the second ribs are set in such a height dimension that top parts of them abut on the lattice members and are set in a smaller rib width than the first ribs.

2. A liquid sealing type vibration control device as set forth in claim 1, wherein a stirring plate is provided within the first liquid chamber, and an orifice on a side of the first liquid chamber is formed between an outer peripheral edge of the stirring plate and an inner peripheral face of the vibration isolating base body.

3. A liquid sealing type vibration control device as set forth in claim 2 wherein a joining portion of the stirring plate on a center side thereof is supported and connected to one end of a support spindle piercing through the vibration isolating base body to be connected to the first attachment fitting.

4. The liquid sealing type vibration control device as set forth in claim 3, wherein the vibration isolating base body is vulcanization bonded to the support spindle and the joining portion of the stirring plate on the center side is fixed by crimping to the one end of the support spindle.

5. A liquid sealing type vibration control device as set forth in claim 2, wherein the inner peripheral surface of the vibration isolating base body forming a chamber wall of the first liquid chamber is made up of a tapered face whose radius is smaller on a remoter side from the partition body and a straight drum-like face of a constant radius connected to a maximum radius portion of the tapered face, and the size and position of the stirring plate is set so that the first liquid chamber side orifice may be formed between part of the tapered face in the vicinity of the maximum radius portion and the stirring plate.

6. The liquid sealing type vibration control device as set forth in claim 1,
   wherein the lattice holes are arranged in plural rows in the circumferential direction of the lattice members;

a plurality of the first ribs are formed in an annular form and constructed so that they may abut on part of each of the lattice members on both sides of each lattice holes row in the radial direction of the lattice members;

a plurality of the second ribs are arranged in a radial fashion relative to an axis center of the elastic partition membrane.

7. A liquid sealing type vibration control device comprising:

a first attachment fitting;

a second attachment fitting;

a vibration isolating base body made of rubber-like elastic material interconnecting these;

a diaphragm attached to the second attachment fitting to form a liquid sealing chamber between the vibration isolating base body and itself;

a partition body comparting the liquid sealing chamber into a first liquid chamber on a side of the vibration isolating base body and a second liquid chamber on a side of the diaphragm; and an orifice putting the first liquid chamber and the second liquid chamber into communication with each other, the partition body including an elastic partition membrane and a pair of lattice members regulating a displacement amount of the elastic partition membrane from both sides thereof, wherein the elastic partition membrane is provided, on both faces thereof, with respective rib groups in a projecting manner;

the rib groups each consist of a plurality of first ribs and a plurality of second ribs mingled with one another;

the first ribs and the second ribs are arranged on a surface of the elastic partition membrane so as to be capable of surrounding lattice holes every lattice hole or a plurality of lattice holes;

the first ribs are set in such a height dimension that top parts of them can be situated apart from the lattice members; and the second ribs are set in such a height dimension that top parts of them abut on the lattice members and are set in a smaller rib width than the first ribs.

8. A liquid sealing type vibration control device as set forth in claim 7, wherein a stirring plate is provided within the first liquid chamber, and an orifice on a side of the first liquid chamber is formed between an outer peripheral edge of the stirring plate and an inner peripheral face of the vibration isolating base body.

9. A liquid sealing type vibration control device as set forth in claim 8 wherein a joining portion of the stirring plate on a center side thereof is supported and connected to one end of a support spindle piercing through the vibration isolating base body to be connected to the first attachment fitting.

10. The liquid sealing type vibration control device as set forth in claim 9, wherein the vibration isolating base body is vulcanization bonded to the support spindle and the joining portion of the stirring plate on the center side is fixed by crimping to the one end of the support spindle.

11. A liquid sealing type vibration control device as set forth in claim 8, wherein the inner peripheral surface of the vibration isolating base body forming a chamber wall of the first liquid chamber is made up of a tapered face whose radius is smaller on a remoter side from the partition body and a straight drum-like face of a constant radius connected to a maximum radius portion of the tapered face, and the size and position of the stirring plate is set so that the first liquid chamber side orifice may be formed between part of the tapered face in the vicinity of the maximum radius portion and the stirring plate.

\* \* \* \* \*